United States Patent
Hamo et al.

(10) Patent No.: US 12,248,704 B2
(45) Date of Patent: Mar. 11, 2025

(54) TRANSFER OF INTERNAL DEVICE DATA OVER COMMAND RESPONSE

(71) Applicant: Western Digital Technologies, Inc., San Jose, CA (US)

(72) Inventors: Eyal Hamo, Naharia (IL); Sagi Taragan, Ramat Ishay (IL); Voltaire Essa, Jish (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/852,366

(22) Filed: Jun. 29, 2022

(65) Prior Publication Data

US 2024/0094948 A1 Mar. 21, 2024

(51) Int. Cl.
*G06F 3/06* (2006.01)
*G06F 11/30* (2006.01)

(52) U.S. Cl.
CPC .......... *G06F 3/0659* (2013.01); *G06F 3/0604* (2013.01); *G06F 3/0679* (2013.01); *G06F 11/3058* (2013.01)

(58) Field of Classification Search
CPC .... G06F 3/0659; G06F 3/0604; G06F 3/0679; G06F 11/3058
See application file for complete search history.

(56) References Cited

U.S. PATENT DOCUMENTS

| | | | |
|---|---|---|---|
| 2017/0060202 A1* | 3/2017 | Sundaram | G06F 1/3275 |
| 2021/0034285 A1* | 2/2021 | Kim | G06F 3/0605 |
| 2021/0208815 A1* | 7/2021 | Park | G06F 3/0659 |
| 2022/0197558 A1* | 6/2022 | Choi | G06F 3/0653 |
| 2023/0125869 A1* | 4/2023 | Jung | G06F 1/3275 |
| 2023/0147477 A1* | 5/2023 | Kim | G06F 3/061 711/154 |
| 2023/0333773 A1* | 10/2023 | Uchida | G06F 3/0655 |

* cited by examiner

*Primary Examiner* — Rocio Del Mar Perez-Velez
*Assistant Examiner* — Tong B. Vo
(74) *Attorney, Agent, or Firm* — Patent Law Works LLP

(57) ABSTRACT

A data storage device comprising a non-volatile storage medium configured to store data, a data port configured to receive and transmit data between a host computer system and the data storage device and a controller. The controller is configured to receive, via the data port, a first command data structure comprising a status reporting activation and receive, via the data port, a second command data structure. In response to receiving the second command data structure, the controller is configured to, determine a response information associated with the second command data structure, and in response to the status reporting activation, determine a status information, and transmit, via the data port, a response data structure comprising the response information and the status information.

20 Claims, 8 Drawing Sheets

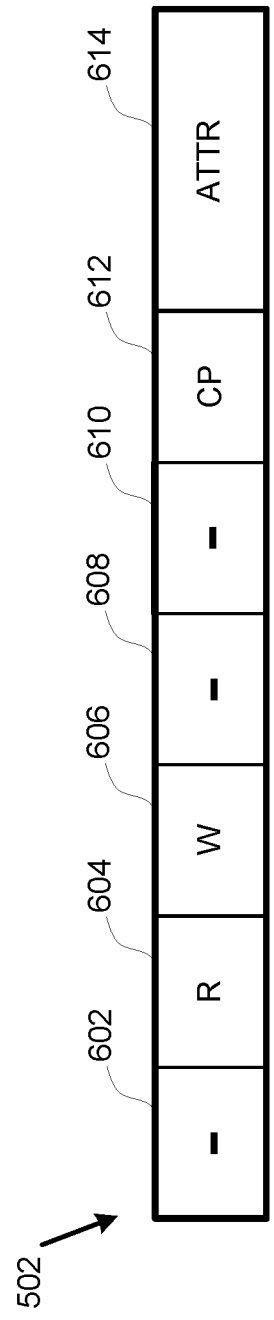

TRANSFER OF INTERNAL DEVICE DATA OVER COMMAND RESPONSE

TECHNICAL FIELD

This disclosure relates to the communication of status information from a data storage device to a host computer system. In particular, this disclosure relates to a data storage device (DSD) that includes device status information in response data structures transmitted to a host computer system.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the computing system. From the perspective of the computing system, a DSD may be implemented as a block storage device where the data stored is in the form of one or more blocks, being sequences of bytes or bits having a maximum length, referred to as block size.

DSDs may be used to supplement the data storage capabilities of a host computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). Integrated DSDs may form a component of a larger system in which a host component utilises the integrated DSD to store data.

In some situations, it is desirable for the host computer system to obtain status information from the data storage device, to enable the host computer system to manage the operation of the data storage device or to enable the host computer system to make operational decisions in light of the status information. The status information may be indicative of the functionality of the data storage device, or indicative of sensed parameters associated with the data storage device.

Furthermore, in some situations, it is desirable for the host computer system to obtain status information from the data storage device with reduced disruption to the operation of the host computer system, the data storage device, or the communication interface there between.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

SUMMARY

Disclosed herein is a data storage device comprising a non-volatile storage medium configured to store data, a data port configured to receive and transmit data between a host computer system and the data storage device, and a controller. The controller is configured to receive, via the data port, a first command data structure comprising a status reporting activation, and receive, via the data port, a second command data structure. The controller is further configured to in response to receiving the second command data structure, determine a response information associated with the second command data structure. The controller is further configured to in response to the status reporting activation, determine a status information, and transmit, via the data port, a response data structure comprising the response information and the status information.

In some embodiments, the second command data structure comprises an operation command. In some embodiments, the controller is further configured to, in response to receiving the second command data structure, perform an operation associated with the operation command.

In some embodiments, in response to the operation command comprising a write preparation command, the response information comprises an indication of readiness to receive data from the host computer system. In some embodiments, in response to the operation command comprising a read command, the operation comprises reading read data from the storage medium, and the response information comprises the read data. In some embodiments, in response to the operation command comprising a write command, the operation comprises writing write data to the storage medium.

In some embodiments, the status reporting activation comprises a selected command type, and the second command data structure is associated with the selected command type. In some embodiments, in response to receiving the first command data structure from the host computer system, the device is configured to transmit, via the data port, a first response data structure.

In some embodiments, in response to receiving the first command data structure from the host computer system, the device is configured to, in response to the status reporting activation, determine a first status information, and transmit, via the data port, the first response data structure comprising the first status information. In some embodiments, determining the device status information comprises determining, from one or more sensors associated with the device, the device status information.

In some embodiments, the status reporting activation is located in a header of the first command data structure. In some embodiments, the device status information is located in a header of the response data structure. In some embodiments, the response data structure is a single data structure comprising the response information and the status information.

In some embodiments, the command data structure is compatible with a version of the JEDEC Integrated UFS Specification. In some embodiments, the first command data structure comprises a UFS Protocol Information Unit data structure.

In some embodiments, the device status information comprises, a plurality of status information data points, or an output of an analysis of the plurality of status information data points. In some embodiments, the device is configured to periodically perform a status information determination process to determine the plurality of status information data points. In some embodiments, the plurality of status information data points have been determined during a time period initiated by the receipt of the first command data structure.

In some embodiments, the status reporting activation comprises an status reporting activation flag and a status reporting category. In some embodiments, determining a status information comprises selecting a status information based on the status reporting category.

In some embodiments, the status information comprises an indication of one or more of: an ambient temperature; a surface temperature; a thermal junction temperature; a power consumption rate; an indication of a counter value; an acceleration; or a measurement from a sensor.

In some embodiments, the device is further configured to, in response to receiving the second command data structure, determine the indication of temperature, wherein determining the indication of temperature comprises receiving the indication of temperature from a temperature sensor associated with the device.

Disclosed herein is a method for providing status information from a data storage device. The data storage device comprises a non-volatile storage medium configured to store data, and a data port configured to receive and transmit data between a host computer system and the data storage device. The method comprises receiving, via the data port, a first command data structure comprising a status reporting activation and receiving, via the data port, a second command data structure. The method further comprises, in response to receiving the second command data structure, determining a response information associated with the second command data structure. The method further comprises in response to the status reporting activation, determining a status information, and transmitting, via the data port, a response data structure comprising the response information and the status information.

Disclosed herein is a data storage device comprising means to store data and means to receive and transmit data between a host computer system and the data storage device. The data storage device further comprises means to receive a first command data structure comprising a status reporting activation, receive a second command data structure, and in response to receiving the second command data structure, determine a response information associated with the second command data structure, and, in response to the status reporting activation, determine a status information, and transmit a response data structure comprising the response information and the status information.

BRIEF DESCRIPTION OF DRAWINGS

One or more implementations of the invention will now be described with reference to the accompanying drawings, in which:

FIG. 5 illustrates the fields of a UPIU header segment, according to an embodiment;

FIG. 6 illustrates the flag field of the UPIU header illustrated in FIG. 5, according to an embodiment;

DESCRIPTION OF EMBODIMENTS

Data storage devices described herein provide an improved solution for providing a host computer system with status information that is determined by the data storage device, or a component or sensor associated with the data storage device.

It is an advantage of the described embodiments that the host may receive the status information from the data storage device without transmitting a dedicated command to the data storage device to request the status information. Accordingly, advantageously, communication overhead (e.g. the number or the size of data structures transmitted over the communication interface between the host computer system and the DSD) to effect the communication of status information from the device to the host computer system, may be reduced.

It is a further advantage of the described embodiments, that the status information may be communicated from the data storage device to the host without the need for the data storage device to wait until the host computer system transmits a dedicated request for the status information. Accordingly, this may allow for a more timely provision of status information from the data storage device to the host computer system.

Figure 1:
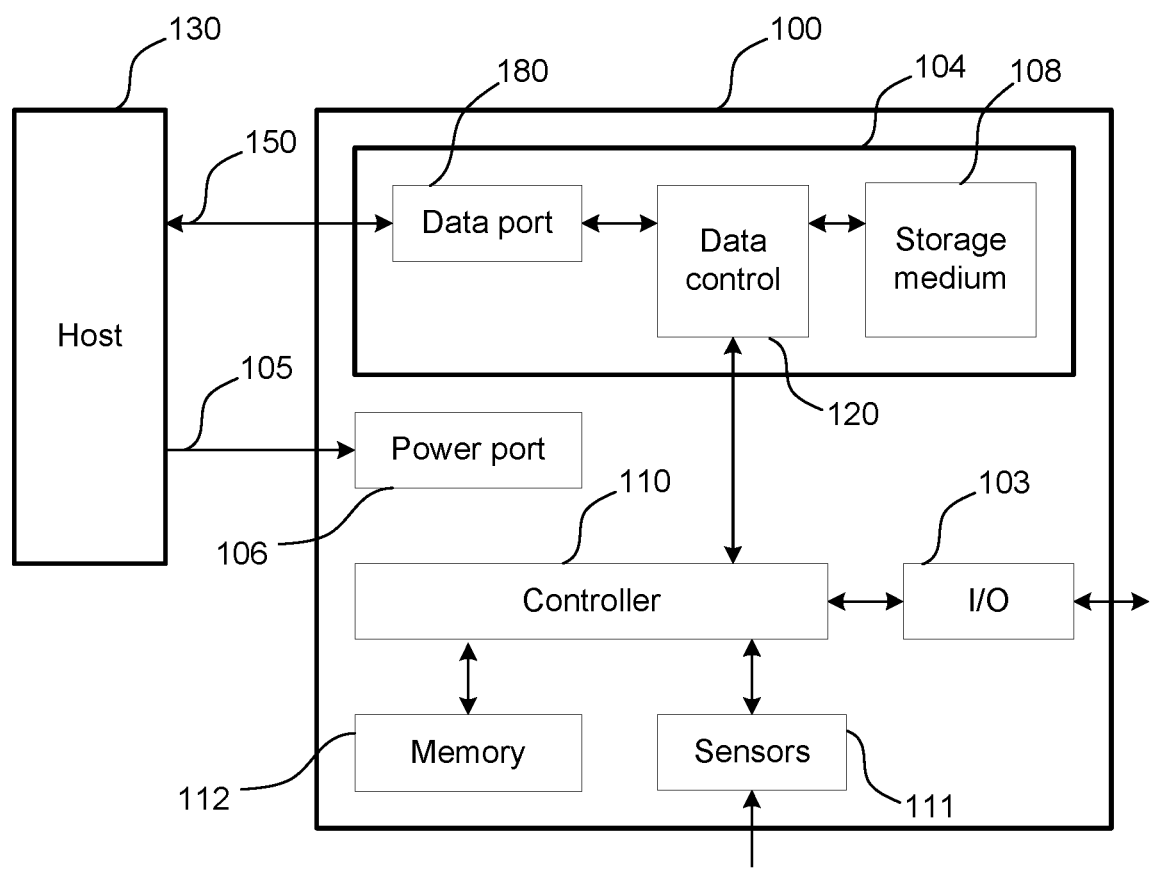
FIG. 1 illustrates a data storage device in communication with a host computer system, according to an embodiment.

FIG. 1—Data Storage Device

FIG. 1 illustrates a data storage device (DSD) 100 (hereinafter 'device 100') and a host computer system 130, according to an embodiment. The device 100 is configured to provide data storage functionality to the host computer system 130 (hereinafter 'the host 130'). The device 100 comprises a data path 104 and a controller 110. The data path 104 comprises a data port 180 configured to receive data from the host computer system 130 and configured to transmit data from the device 100 to the host 130.

Storage Medium

The device 100 further comprises a storage medium 108 to provide data storage functionality to the host 130. The storage medium 108 may also store data to be utilised by the device 100. The data stored in data store 108 may include one or more blocks of data organized into files, for example including images, documents, videos, etc., according to a particular file system operable by the host 130. The storage medium 108 is non-transitory so as to retain the stored data irrespective of whether the medium 108 is powered. The medium 108 may comprise flash memory, which may be in the form of secure digital (SD) memory or iNAND® embedded flash memory. The medium 108 may comprise a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the data is written in blocks to the storage medium 108 and read in blocks from the storage medium 108.

Interfaces

Data interface 150 is configured to transmit data to and from the data port 180 and the host 130. The data interface 150 may comprise a wired interface, a wireless interface, a packet switched network, a memory buffer, a memory space that is accessible by the host and the device, any combination of these means, or another means of conveying data between the host and the device. Data transmitted over the data interface 150 may comprise commands, command responses, status information, data, user data or other digital information. The host 130 may comprises a device driver which is configured to communicate with the device 100 over data interface 150.

The host 130 may further be configured to provide power to the device 100 over power interface 105 to power port 180. The power port 106 and the data port 180 may be implemented collectively as, for example, some form of USB port (e.g., USB-A, USB-8, USB-C, mini-USB, micro-USB, etc.), a Thunderbolt port, a Power over Ethernet (PoE) port, or a similar port. The device 100 may receive power from a source other than the host 130.

Data Control

The device 100 further comprises a data control unit 120. The data control unit 120 is configured to perform read operations to read data from the storage medium 108 and provide data to the host 130 via the data port 180, or to the controller 110 for use by the controller 110. The data control unit 120 is further configured to perform write operations to write data, received from the host 130 via the data port 180, to the storage medium 108. The data control unit 120 may further write data, received from the controller 110, to the storage medium 108. In some embodiments, the data control unit 120 may process the data before writing data to the storage medium.

In some embodiments, the data control unit 120 includes a cryptography engine configured to receive, interpret and execute commands received from host 130 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine may be connected between the data port 180 and the storage medium 108 and be configured to use a cryptographic key to encrypt data to be stored on the storage medium 108, and to decrypt the encrypted data stored on the storage medium 108 in response to a request from the host 130. The controller 110 causes the cryptography engine 107 to control a cryptographic state of the data stored in the storage medium 108 (i.e., encrypted or plain). In one mode of operation, the unencrypted data may pass through the data path 104 to the host 130 via the data port 180.

Controller

The device 100 further comprises a controller 110. The controller 110 may be comprised of one or more processors, microprocessors, microcontrollers or controlling circuitry. The controller 110 is configured to execute program code stored within the system memory 112 to issue commands for controlling the operation of the device 100. Accordingly, actions performed by the device 100 may be considered to be actions performed by the controller 110. Similarly, decisions and determinations made by the device 100 may be considered to be decisions and determinations made by the controller 110.

The system memory 112 may store device specific data, such as a unique identifier of the device 100. The system memory 112 may further store configuration information which defines the function of the device 100. The device 100 may receive configuration information from the host 130, and store the configuration information in the system memory 112.

The function of the controller 110 includes, but is not limited to, controlling data transmission through data path 104, and responding to commands receive from the host 130, as described herein below.

IO Interface

The device 100 may include an input/output (IO) interface 103. The IO interface 103 may include one or more input components configured to accept an input from a user. For example, the input components may include a set of buttons or a keypad, or a similar arrangement of mechanical components that collectively enable the selection of digits or characters for entering into the device 100. The input components may also include one or more communications devices, such as a wireless modem, configured to receive and transmit data wirelessly via the transmission of an electronic message in a predetermined form.

The IO interface 103 may include one or more output components configured to indicate information to a user. For example, the output components may include a speaker, configured to emit audible signals, one or more visual indicators, such as a light or a display, configured to emit visual signals.

In one embodiment, the visual indicators include at least one data access state indicator configured provide a user with an indication of the data access state of the device 100. The DA state indicator visually displays the data access state to a user.

Sensors

The device 100 may include a sensor component 111 configured to receive sensor information from one or more sensors within the device 100 or in communication with the device 100. The sensor component 111 may be configured to receive sensor information from an ambient temperature sensor, a surface temperature sensor configured to determine a surface temperature associated with the enclosure of the device 100, a thermal junction sensor, a power rate consumption sensor, an accelerometer, or another sensor.

DSD Enclosure

The device 100 may include an enclosure configured to physically house the components of the device 100. The enclosure may formed from a rigid, or semi-rigid, material with particular properties (e.g., electrical resistance and impact strength) suited to protecting the internal components of device 100. For example, the material of the enclosure may include a polycarbonate (PC), an acrylonitrile butadiene styrene (ABS), an acrylic, a thermoplastic polyester, a metal, or a combination of any of these.

Power

The power interface 105 between the host 130 and the device 100 supplies power from the host 130 to the power port 106 of the device 100. In one embodiment, the power interface 105 comprises a USB interface which is configured to supply typically 5 V at 500 mA or higher currents. In one embodiment, the power interface 105 comprises a wireless charging interface. In one embodiment, in response to the device 100 being operably coupled to host 130 via interface 105, the device 100 consumes power from the host 130 to operate the electronic circuitry of the device 100.

Figure 2:
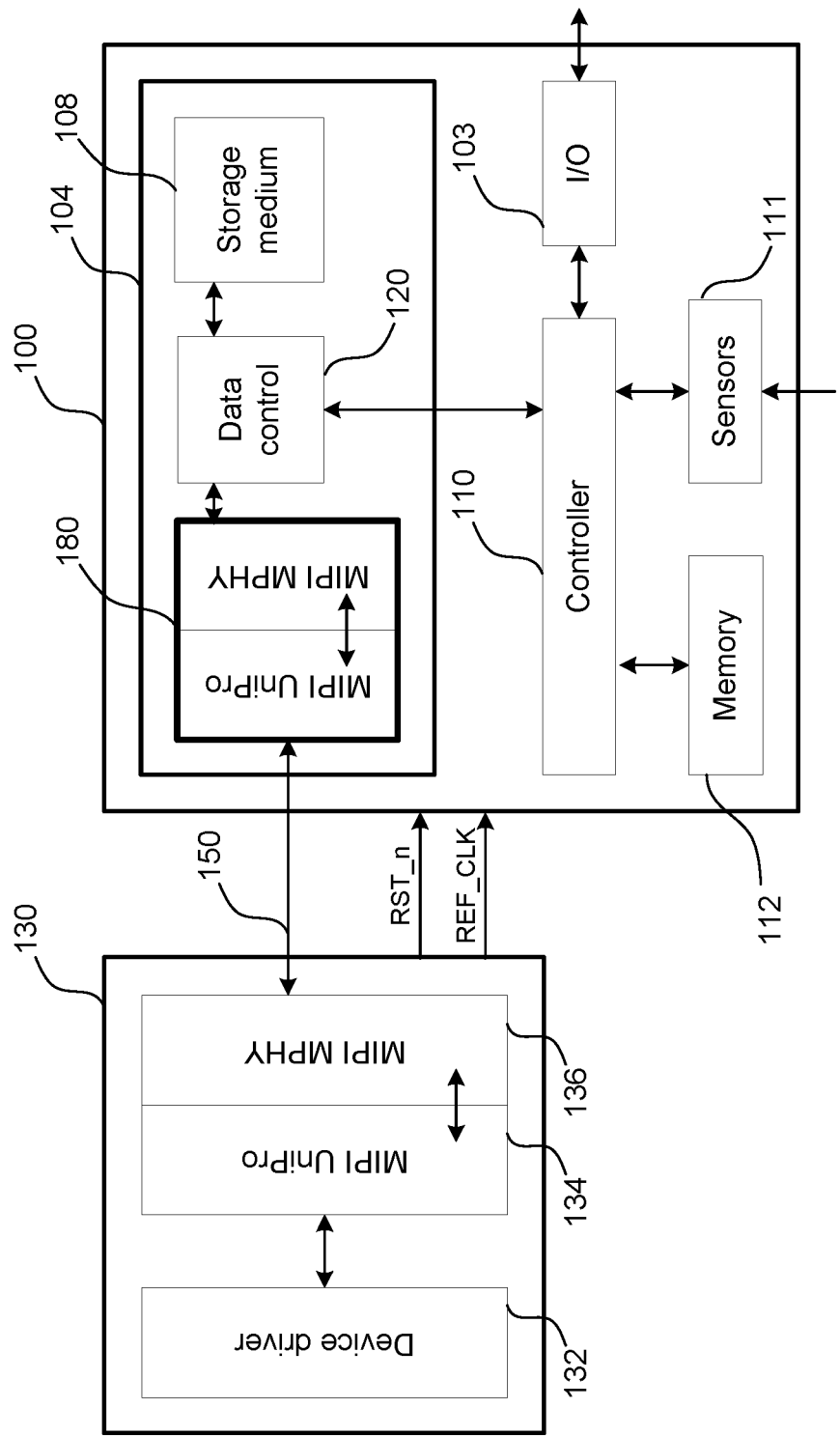
FIG. 2 illustrates additional internal components of the data storage device and the host computer system of FIG. 1, according to an embodiment.

FIG. 2—Unified Flash Storage

FIG. 2 illustrates a data storage device (DSD) 100 and a host computer system 130, according to another embodiment. In the embodiment illustrated in FIG. 2, the device 100 is configured to communicate with the host 130 according to the Universal Flash Storage (UFS) communication protocol, as defined by the Joint Electron Device Engineering Council (JEDEC) Solid State Technology Association. In particular the device 100 and the host communication according to the JEDEC UFS protocol, version 4.0.

In the embodiment illustrated in FIG. 2, the data interface 150 comprises a Unified Protocol (UniPro) interface. UniPro is a high-speed interface technology which may be used to interconnect integrated circuits. The data interface 150 may comprise a plurality of wires or connections. The data interface 150 may form a Mobile Industry Processor Interface physical layer (MIPI M-PHY®) over which the host 130 may communicate with the device 100 via a Mobile Industry Processor Interface Unified Protocol (MIPI UniPro®) protocol stack, which includes the UFS Transport Protocol (UTP) layer. The power interface 105 may be electrically coupled to a power supply that is compatible with the JEDEC UFS protocol such as a Voltage Common Collector (VCC) power supply 2.5 V, a VCCQ power supply 1.2 V, or a VCCQ2 power supply 1.8 V.

The host 130 comprises a device driver 134 which the host uses to control the functionality of the device 100. The device driver 134 interfaces to the device 100 via the host side MIPI UniPro® protocol stack 134 and the MIPI M-PHY® layer 136. On the device 100 side, the data port 180 comprises a corresponding MIPI UniPro® protocol stack and a MIPI M-PHY® layer, via which the data control unit 120 may interface with the host 130.

Data Structures

The host 130 and the device 100 communicate via the transmission of data structures over the data interface 150. In one embodiment, a data structure comprises a sequence of digital UFS UPIU Data Structures In one embodiment, the command data structures transmitted by the host computer system 130, and the response data structures transmitted by the device 100 are compatible with one or more JEDEC UFS communication standards. In one embodiment, the command data structures transmitted by the host computer system 130, and the response data structures transmitted by the device 100 are compatible with the JEDEC Integrated UFS 4.0 communication standard.

In accordance with the JEDEC Integrated UFS 4.0 communication standard, UFS Transport Protocol Transactions consist of data structures called UFS Protocol Information Units (UPIUs) that travel between a host and a device on the UniPro bus. A UPIU transaction is initiated by an Initiator device and is responded to by a Target device, in the form of a Request-Response operation. The Initiator device starts the sequence of transactions by sending a request to a Target device. The Target device will then response with a series of transactions that eventually end in a response transaction.

With reference to the terminology used within the JEDEC UFS protocol specification, the host 130 may be referred to as the Initiator, and the device 100 may be referred to as the Target.

In accordance with the JEDEC Integrated UFS 4.0 communication standard, UFS UPIUs comprise a single basic header segment, transaction specific fields, possible one or more extended header segments and zero or more data segments.

Device Status Information

It may be advantageous for the host 130 to be able to determine information regarding the status of the device 100 or the status of components or sensors associated with the device 100. Such information may be referred to as device status information (DSI). A DSI may comprise an indication of an internal temperature of the device 100, an indication of a surface temperature of the enclosure of the device 100, and indication of a thermal junction temperature within the device 100, a current rate of power consumption by the device 100, an indication of a counter value, an accelerometer measure, a remaining power level for a device that comprises an internal battery, or any other measureable or determinable attribute of the device 100, or a component or sensor associated with the device 100.

Figure 3:
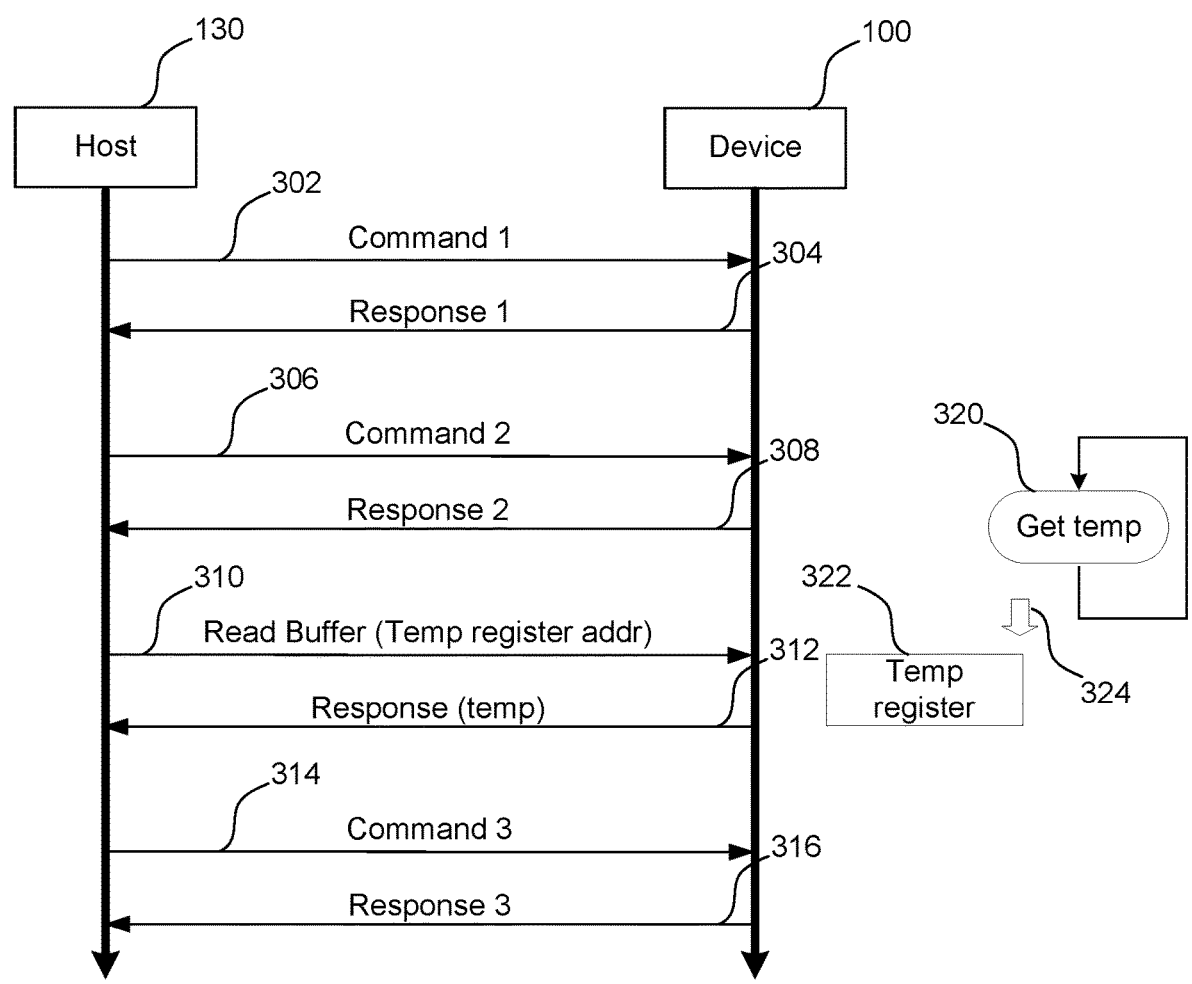
FIG. 3 is a message flow diagram illustrating a transmission of messages to and from a host and a device, according to an example.

FIG. 3—A Method of Determining DSI

In one embodiment, the device 100 may comprise one or more DSI registers that are read-accessible to the host 130. The DSI registers may be within the storage medium 108, or within system memory 112 or in other volatile or non-volatile memory.

FIG. 3 is a message flow diagram illustrating a transmission of messages to and from the host 130 and the device 100, according to an example. FIG. 3, and other message flow diagrams incorporated herein, provide an indicative representation of the ordered transmission of communications between the host and the device over data interface 150. Communications may be in the form of data structures, and any data structures may be transmitted across data interface 150 as contiguous transmission, or as a set of discrete transmissions which may be collated by the receiver. Communications transmitted earlier in time are represented at the top of the message flow diagram, with the transmission of subsequent data structures depicted under earlier transmissions. It is not intended that FIG. 3, and other message flow diagrams incorporated herein, be drawn to scale. Furthermore, it is understood that FIG. 3, and other message flow diagrams incorporated herein, may not represent the entirety of communications occurring between the host and the device, and that additional communications may be transmitted between the communications represented in the incorporated message flow diagrams.

In the example of FIG. 3, the host 130 communicates with the device 100 via command-response transactions. The host transmits a command data structure 302 to the device. In response to receiving the command data structure 302, the device may perform an operation. Furthermore, in response to receiving the command data structure 302, the device transmits a response data structure 304. In some situations, response data structure 304 may comprise an acknowledgement of receipt of command data structure 302. In some situations, response data structure 304 may comprise information or data provided by the device in response to receiving command data structure 302. Communications 306 and 308, and 3014 and 316 comprise further command-response transactions.

In the example of FIG. 3, the host 130 obtains the indication of the surface temperature from the device 100, and utilises this information to determine whether the device is operating within safe operating parameters.

The device 100 maintains a DSI register 322, which is configured to store an indication of the surface temperature of the enclosure of the device 100. The controller 110 stores the DSI, being the indication of the surface temperature of the enclosure, in a DSI register 322, which is part of the storage medium 108. The controller 110 determines the DSI by periodically executing a process 320 in which the controller 110 determines, from the sensors 111 an indication of the surface temperature of the enclosure. The controller 110 writes the indication of the surface temperature into the DSI register 322. In one example, the controller 110 executes process 320 every 5 minutes, meaning that the data stored in the DSI register 322 may be up to 5 minutes old.

To determine the indication of the surface temperature, the host 130 transmits a Read Buffer command 310 to the device 100. The Read Buffer command 310 includes an indication of the address of the temperature register 322. In response to receiving the Read Buffer command 310, the controller 110 reads the contents of the DSI register 322 and assembles a Response data structure 312, wherein the Response data structure 312 comprises the contents of the DSI register 322.

Following the request-response transaction, 310 and 312, initiated by the host to receive the DSI, being the indication of the surface temperature, the host is able to continue with regular functionality, including the transmission of Command 3 314, and the subsequent receipt of Response 3 316.

Accordingly, to receive the indication of the surface temperature from the device 100, the host 130 interrupts its normal operation and initiates a dedicated request-response transaction, 310 and 312. The request-response transaction, 310 and 312 occupies the data interface 150 between the host and the device and adds to overhead on this communication channel. In a typical implementation, each request-response transaction does not merely comprise the DSI, but also comprises header information associated with each of the request 310 and the response 312.

In a situation in which the host has cause to request the DSI frequently, or repetitively, the acquisition of device status information by the host may contribute substantially and adversely to overhead on the communication channel 150 between the host and the device. This overhead may adversely affect the functionality of either or both of the host 130 or the device 100.

Furthermore, in the embodiment illustrated in FIG. 3, the DSI register 322 that comprises the indication of surface temperature is only updated periodically by process 320. The surface temperature is not determined in response to receiving the command 310 to read the DSI register. Accordingly, at the time that the controller 110 assembles the response data structure 312, the surface temperature measurement stored in DSI register 322 may be no longer indicative of the current surface temperature of the device enclosure.

To provide a more recent measure of temperature, the process 320 may be executed more frequently; however, the more frequent execution of process 320 may be disadvantageous in terms of increasing power consumption and consuming processing time of the device's one or more processors. Accordingly, it may be desirable to determine DSI, as needed, in response to the receipt of a request from the host to receive the DSI.

Host Activated Status Reporting

Described herein are embodiments for enabling host-activated reporting of DSI from the device, in which the device embeds the DSI in data structures that the device is already transmitting to the host. Accordingly, embodiments described herein ameliorate the overhead associated with the host's request for DSI and the device's provision of DSI to the host. Additional advantages of the methods described herein will be apparent in light of embodiments described herein.

In a command data structure transmitted by the host to the device, the host embeds a 'status reporting activation' which may be interpreted by the device as a request to provide DSI to the host. In response to the status reporting activation, the device embeds the DSI in a subsequent response data structure that the device transmits back to the host.

In one embodiment, the one or more bits indicating the status reporting activation are located within data structure fields that are defined, by a communication standard, as being reserved fields. Although the communication standard may suggest or require that the contents of the reserved fields are set to a specific value (e.g. set to all zeros), data structures that comprise the status reporting activation within the reserved data structure fields, are considered to be compatible with the relevant communication standard.

In some embodiments, the status reporting activation only indicates the activation, or otherwise, of status reporting. In other embodiments, the status reporting activation may further comprise an indication of a status reporting category, which indicates, to the device 100, the category of DSI that should be determined by the device and be included in a response data structure transmitted to the host 130. In some embodiments, the status reporting activation may comprise additional information that indicates which type of command data structures the device should provide DSI in response to.

Figure 4:
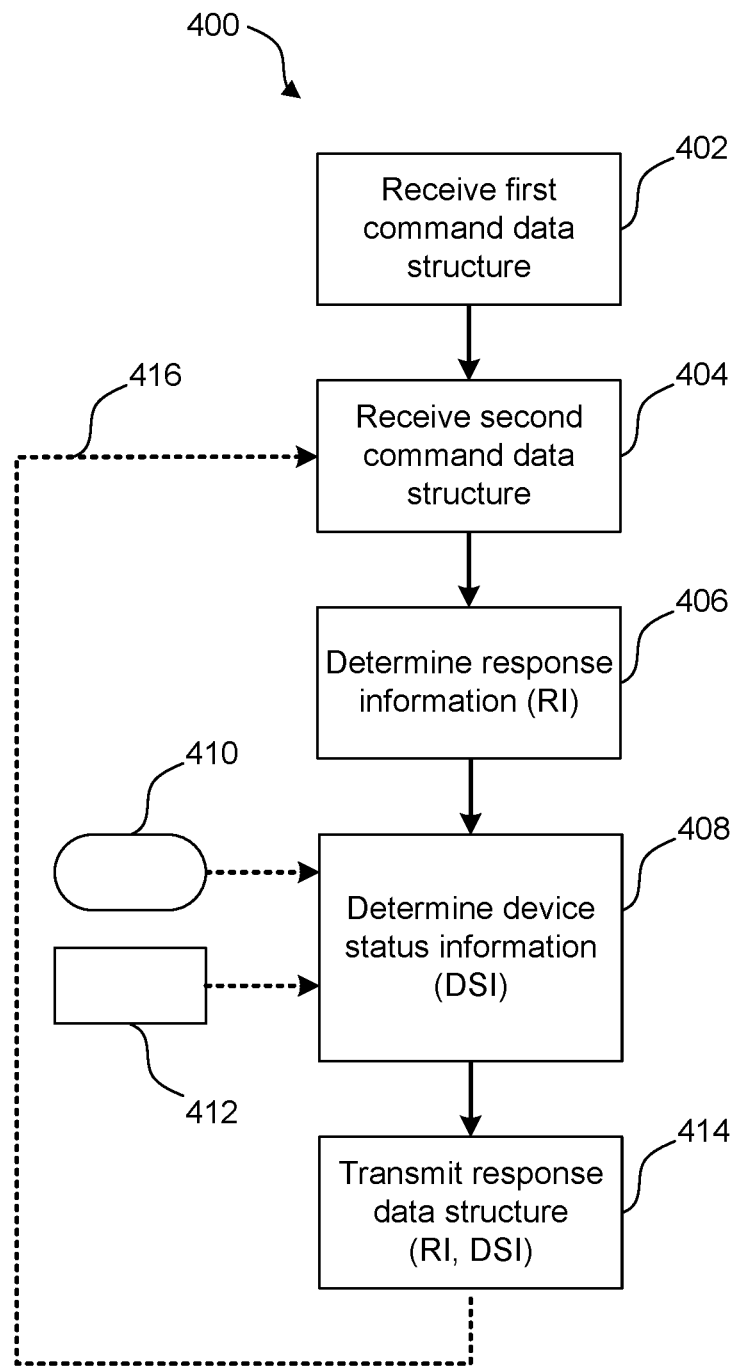
FIG. 4 is a flowchart illustrating a method for transmitting device status information from a data storage device, according to an embodiment.

FIG. 4—an Improved Method

FIG. 4 is a flowchart illustrating a method 400 for transmitting device status information from a data storage device, according to an embodiment. Method 400 is performed by the controller 110 of the device 100.

In step 402, the device 100 receives, via data port 180, a first command data structure from the host 130. The first command data structure comprises status reporting activation. The status reporting activation may be located within a field of the first command data structure.

In step 404, the device 100 receives, via data port 180, a second command data structure from the host 130. The second command data structure comprises a command for the device 100 to perform an action. The second command data structure may be any data structure transmitted from the host 130 to the device 100 that elicits a response that the device 100 transmits to the host 130.

In step 406, in response to the device 100 receiving the second command data structure from the host 130, the device 100 determines response information associated with the command defined by the second command data structure.

In step 408, in response to the device 100 receiving the second command data structure from the host 130 and in response to the status reporting activation, received in step 402, comprising a DSI activation, the device 100 determines device status information (DSI) in 408. In one example, the device 100 determines the DSI by executing a process 410 that determines the DSI. In one example, the device 100 determines the DSI by reading the DSI from a register 412.

The device 100 may perform steps 406 and 408 in parallel, or in any sequence.

In step 414, the device 100 transmits, via the data port 180, a response data structure, wherein the response data structure includes the response information determined in step 406 and the DSI determined in step 408.

As indicated by line 416, the device 100 may receive further command data structures. In response to receiving each command data structure, the device 100 determines response information to the command data structure, in step 406, and DSI, in step 408.

Advantageously, in response to transmitting a command data structure to the device 100 the host 130 receives both the response information and the DSI. This advantageously arrangement is activated by the host through the transmission of a command data structure that comprises status reporting activation that comprises DSI activation.

FIGS. 5 and 6—UPIU Header

FIG. 5 illustrates the fields of a UPIU header segment 500 in accordance with the JEDEC Integrated UFS 4.0 communication standard, according to an embodiment. The JEDEC Integrated UFS 4.0 communication standard defines a plurality of different UPIU transaction types. Transaction type field 506 may be used by the transmitter of a UPIU data structure to indicate the type of UPIU transaction to which the data structure belongs.

The UPIU header segment further comprises a flag field 502. FIG. 6 illustrates the flag field 502 of the UPIU header 500 illustrated in FIG. 5 for a Command UIPU data structure, according to an embodiment. The flag field 502 for a Command UIPU data structure comprises a read flag 604, which indicates a read data operation from the device to the host, and a write flag 606, which indicates a write data operation from the host to the device. The flag field 502 further comprises a command priority flag 612 and an attribute flag 614. The flag field 502 further comprises three reserved bits 602, 608 and 610, which are not used for the Command UIPU. In one embodiment, the host 130 locates the status reporting activation in one or more of the three reserved bits 602, 608 and 610.

Location of Status Reporting Activation

In one embodiment, the command data structure comprises a JEDEC USF 4.0 Command UIPU data structure. Alternatively, the command data structure may comprise a JEDEC USF 4.0 Data Out UPIU data structure. Alternatively, the command data structure may comprise any command issued by the host 130 to the device 100.

In one embodiment, the status reporting activation is located within one or more reserved fields of the UIPU header. For example, the host 130 may locate the status reporting activation in one or more of the three reserved bits 602, 608 or 610 of the flag field 520 of a UPIU header for a command data structure of type=Command.

In one embodiment, the status reporting activation is located with the body of the command data structure. In one embodiment, the status reporting activation is located within one or more reserved fields of the UIPU body.

In one embodiment, the status reporting activation comprises a single bit flag, which when set to '1' indicates that status reporting is activated, and when set to '0' indicates that status reporting is deactivated.

Location of Device Status Information

In one embodiment, the response data structure comprises a JEDEC USF 4.0 Response UIPU data structure. Alternatively, the command data structure may comprise a JEDEC USF 4.0 Data In UPIU data structure or a JEDEC USF 4.0 Ready To Transfer UPIU data structure. Alternatively, the command data structure may comprise any command issued by the device 100 to the host 130.

In one embodiment, the device status information (DSI) is located within one or more reserved fields of the UIPU header. For example, the device 100 may locate the DSI in one or more of the reserved bytes 5, or 16 to 31 of the JEDEC USF 4.0 Response UPIU data structure. In another example, the device 100 may locate the DSI in one or more of the reserved bytes 5, 6, 7, 9 or 20 to 31 of the JEDEC USF 4.0 Data In UPIU data structure. In another example, the device 100 may locate the DSI in one or more of the reserved bytes 5, 6, 7, 9 or 20 to 31 of the JEDEC USF 4.0 Ready To Transfer UPIU data structure.

Figure 7:
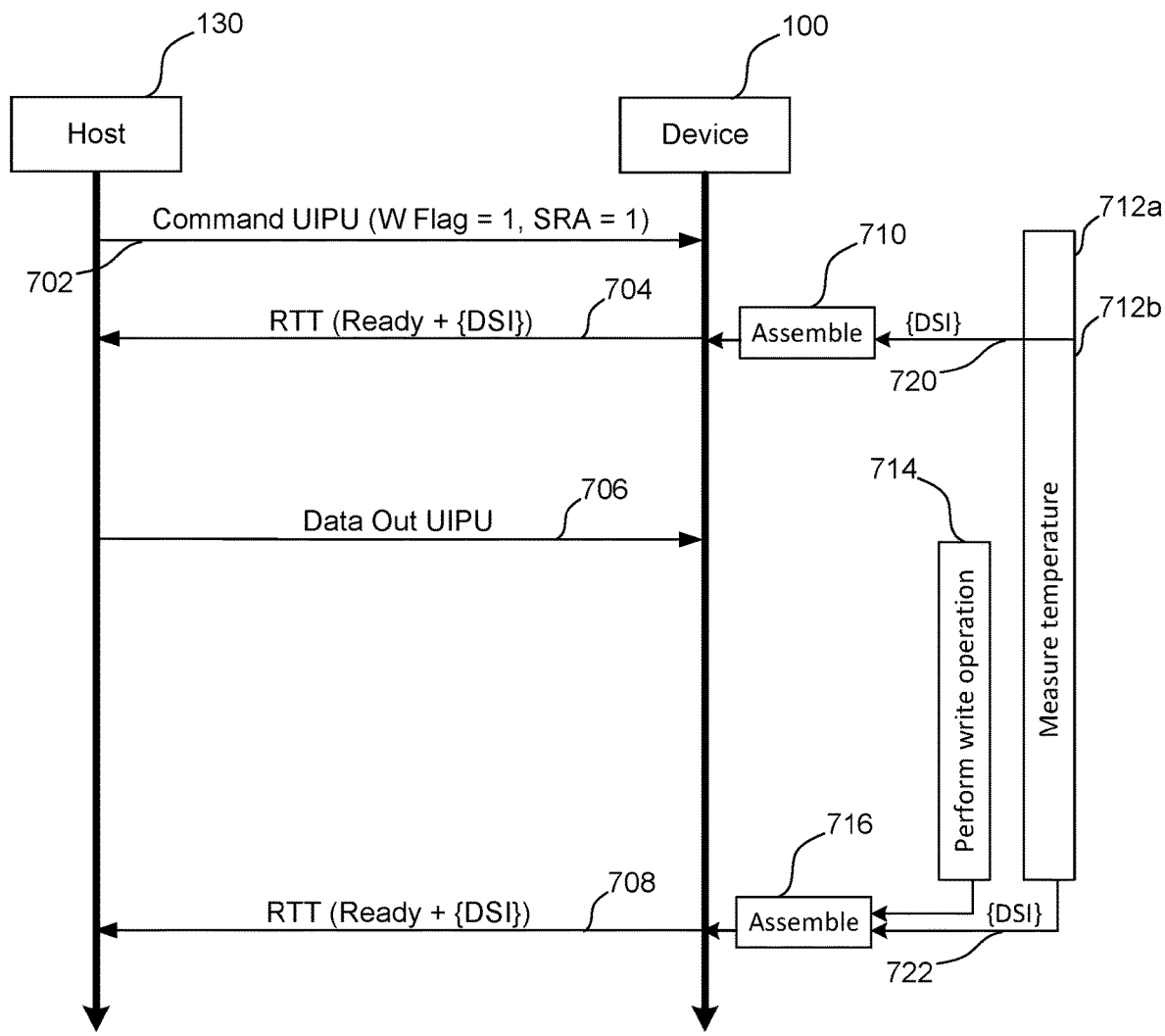
FIG. 7 is a message flow diagram illustrating a transmission of messages to effect the writing of data from the host to the storage medium of the device, according to an embodiment.

FIG. 7—Data Write Example

FIG. 7 is a message flow diagram illustrating a transmission of messages to effect the writing of data from the host 130 to the storage medium of the device 100, according to an embodiment. In the example illustrated in FIG. 7, the host activates status reporting, causing the device to determine temperature measurements and report the temperature measurements back to the host.

The functionality the device 100 in the example of FIG. 7 is in accordance with method 400. Accordingly, the functionality of the host 130 and the device in FIG. 7 may be contrasted with the functionality of the host and the device in the example illustrated in FIG. 3, in which the device does not function in accordance with method 400. Similarly, the messages transmitted across data interface 150 in FIG. 7 may be contrasted with the messages transmitted across data interface 150 in FIG. 3.

The first command data structure 702 comprises a Command UIPU data structure in which the write flag 606 is set. Accordingly, the Command UIPU data structure 702 indicates that the host intends to transmit data from the host to the device, wherein the data is to be written to the storage medium 108. The data transmitted from the host to be written to the storage medium 108 may be referred to as write data. The Command UIPU data structure 702 requests that the device 100 indicate whether the device is ready to receive the write data from the host 130.

In this example, the status reporting activation comprises a status reporting activation flag and a status reporting activation type. The status reporting activation flag indicates, to the device, that the device should activate status reporting. The status reporting activation type indicates, to the device, the type of status reporting that the device should perform.

The host is configured to use flag 608 of the first command data structure 702 to indicate the status reporting activation flag, with a flag value of 1 indicating that the device should activate status reporting, and a flag value of 0 indicating that the device should deactivate, or keep deactivated, status reporting.

The host is further configured to use flag 610 of the first command data structure 702 to indicate the status reporting activation type. In response to the status reporting activation type being set to 1, the device should perform periodic DSI measurements (for example, every second) and collate a set of DSI measurements to be transmitted to the host with each response data structure transmitted to the host. In response to the status reporting activation type being set to 0, the device should perform single DSI measurements only, and only in response to the receipt of a command data structure.

The host sets flag 608 of the Command UIPU data structure 702 to 1, therefore activating status reporting on the device, and sets flag 610 of the Command UIPU data structure 702 to 1, therefore activating periodic DSI measurements and the transmission of DSI sets to the host. The DSI measurements in this example comprise temperature measurements. In this example, the device has been configured to transmit DSI in response to the receipt of the first command data structure. In another embodiment, the device may be configured to start transmitting DSI only in response to receiving a subsequent (i.e. a second) command data structure. In another embodiment, this functionality may be configurable by the host setting a flag in the UPIU header.

In response to receiving the Command UPIU data structure 702, the controller 110 causes the device 100 to determine whether the device is ready to receive the write data from the host, and whether the device is ready to write the write data to the storage medium 108. This determination may comprise a determination of the available storage space within the storage medium. Accordingly, the controller determines first response information, which comprises an indication that the device is ready to receive the write data from the host and an indication that the device requests that the write data be transmitted from the host in a plurality of portions.

The first response information may further comprise an indication of the size of a portion of the write data that the device is ready to receive, and whether the device requires the write data to be transmitted from the host in sequence, or out of order.

In response to the Command UPIU data structure 702 comprising a set SRA flag 608, and a set 610 flag, the controller determines a first status information, being a plurality of DSI data points 720 (also referred to as a plurality of status information data points 720). The plurality of DSI data points 720 were determined by the controller 110 through execution of a status information determination process, in this case a temperature measurement process, over time period 712a. Time period 712a comprises a time period initiated by the receipt of the first data structure 702.

The controller assembles 710 the first response information and the plurality of DSI data points 720 into a first response data structure 704, which comprises a Ready to Transfer (RTT) UPIU data structure. The device transmits the RTT UPIU data structure 704 to the host. The first response data structure comprises the first response information and the first plurality of DSI data points 720.

The host transmits a second command data structure 706, which comprises a Data Out UPIU data structure. The Data Out UPIU data structure 706 comprises a portion of write data and commands the device 100 to write the portion of write data to the storage medium 108.

In response to receiving the second command data structure 706, the controller 110 determines second response information associated with the Data Out UPIU data structure 706. The second response information comprises an indication that the device is ready to receive further portions of the write data. Furthermore, in response to the first command data structure 702 including a set SRA flag 608, the controller 110 determines a second plurality of DSI data points 722, which have been determined by the controller 110 through execution of the measure temperature process over time period 712b.

The controller 110 assembles 716 the second response information and the second plurality of DSI data points 722 into a second response data structure 708, which comprises a RTT UPIU data structure. The device 100 transmits the second response data structure 708 to the host.

In one embodiment, the controller may be configured to analyse the DSI or plurality of status information data points to determine an output of the analysis. The controller may include the output of the analysis in the response data structure instead of, or in addition to, including the DSI or plurality of DSI data points in the response data structure. For example, the controller may be configured to determine an average of the DSI data points over a period of time, and to include the average in the response data structure.

Figure 8:
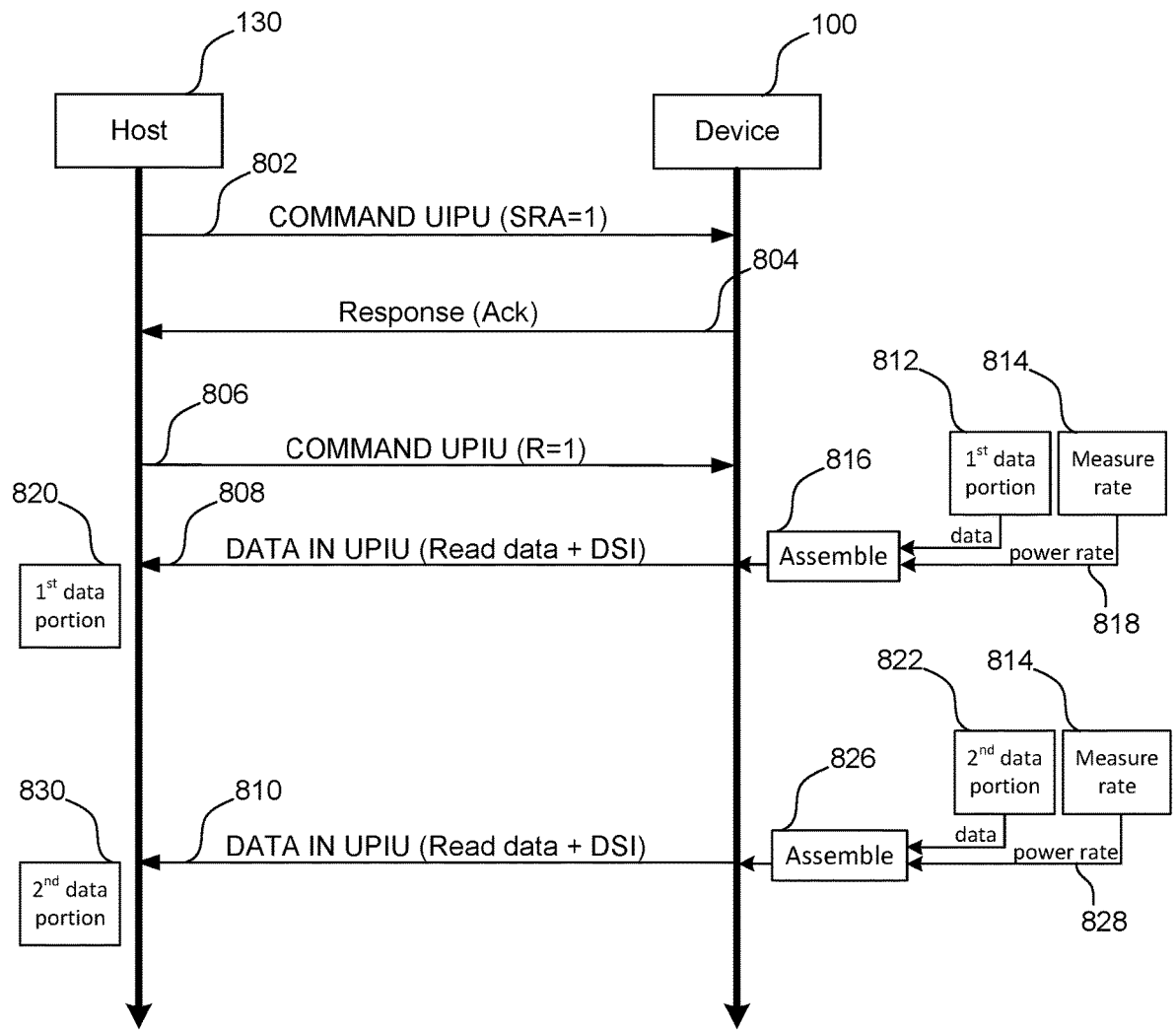
FIG. 8 is a message flow diagram illustrating a transmission of messages to effect the reading of data from the device to the host, according to an embodiment.

FIG. 8—Data Read Example

FIG. 8 is a message flow diagram illustrating a transmission of messages to effect the reading of data from the storage medium 108 of the device 100 to the host 130, according to an embodiment. In the example illustrated in FIG. 8, the host activates status reporting via a first command data structure. The host also indicates a status reporting category of 'power consumption rate' via the first command data structure, which causes the device to determine power consumption rate and report the power consumption rate back to the host in response to subsequent command data structures.

In this example, the status reporting activation (SRA) included in the first command data structure 802 comprises a status reporting activation flag and a status reporting category. The status reporting activation flag indicates, to the device, that the device should activate status reporting. The status reporting category indicates, to the device, the category of DSI that the host would like to receive.

The host is configured to use flag 602 of the first command data structure 802 to indicate the status reporting activation flag, with a flag value of 1 indicating that the device should activate status reporting, and a flag value of 0 indicating that the device should deactivate, or keep deactivated, status reporting.

The host is configured to use flags 608 and 610 of the first command data structure 802 to indicate the status reporting category, with a value of '00' indicating that the host requests thermal junction temperature measurements as the DSI, a value of '01' indicating that the host requests surface temperature measurements as the DSI, a value of '10' indicating that the host requests power consumption rate as the DSI, and a value of '11' indicating that the host would like to receive a surface temperature measurement, and T-Junction temperature measurement and a power consumption rate measurement as the DSI.

The host sets flag 602 of the Command UIPU data structure 802 to 1, therefore activating status reporting on the device, and sets flags 608 and 610 of the Command UIPU data structure 802 to '10', therefore selecting the status reporting category to be the power consumption rate.

In response to receiving the Command UPIU data structure 802, the controller 110 causes the device 100 to transmit an response data structure 804 comprising an acknowledgement of receipt of command data structure 802.

The host transmits a second command data structure 806, which comprises a Command UIPU data structure in which the read flag 604 is set. Accordingly, the Command UIPU data structure 806 indicates that the host requests the device to read 'read data' from the storage medium 108 of the device and transmit the read data to the host. The Command UIPU data structure 806 includes an indication of the address of the read data in the storage medium, and an indication of the length of the read data.

In response to receiving the second command data structure 806, the controller determines the first response information, being the first portion of read data 812 from the storage memory.

In response to the first command data structure 802 comprising a set SRA flag 602, and in response to the status reporting category being power consumption rate, the controller selects power consumption rate 818, as determined by the status information determination process 814, to be the first status information.

The controller assembles 816 the first portion of read data 812 and the power consumption rate 818 into a first response data structure 808, which comprises a DATA IN UPIU data structure. The device transmits the DATA IN data structure 808 to the host.

Further, in response to receiving the second command data structure 806, the controller determines a second response information, being the second portion of read data 822 from the storage memory. In response to the first command data structure 802 comprising a set SRA flag 602, the controller determines a second status information, being a power consumption rate 828 as determined by the process 814. The controller assembles 826 the second portion of read data 812 and the power consumption rate 828 into a second response data structure 810, which comprises a DATA IN UPIU data structure. The device transmits the DATA IN data structure 810 to the host.

Figure 9:
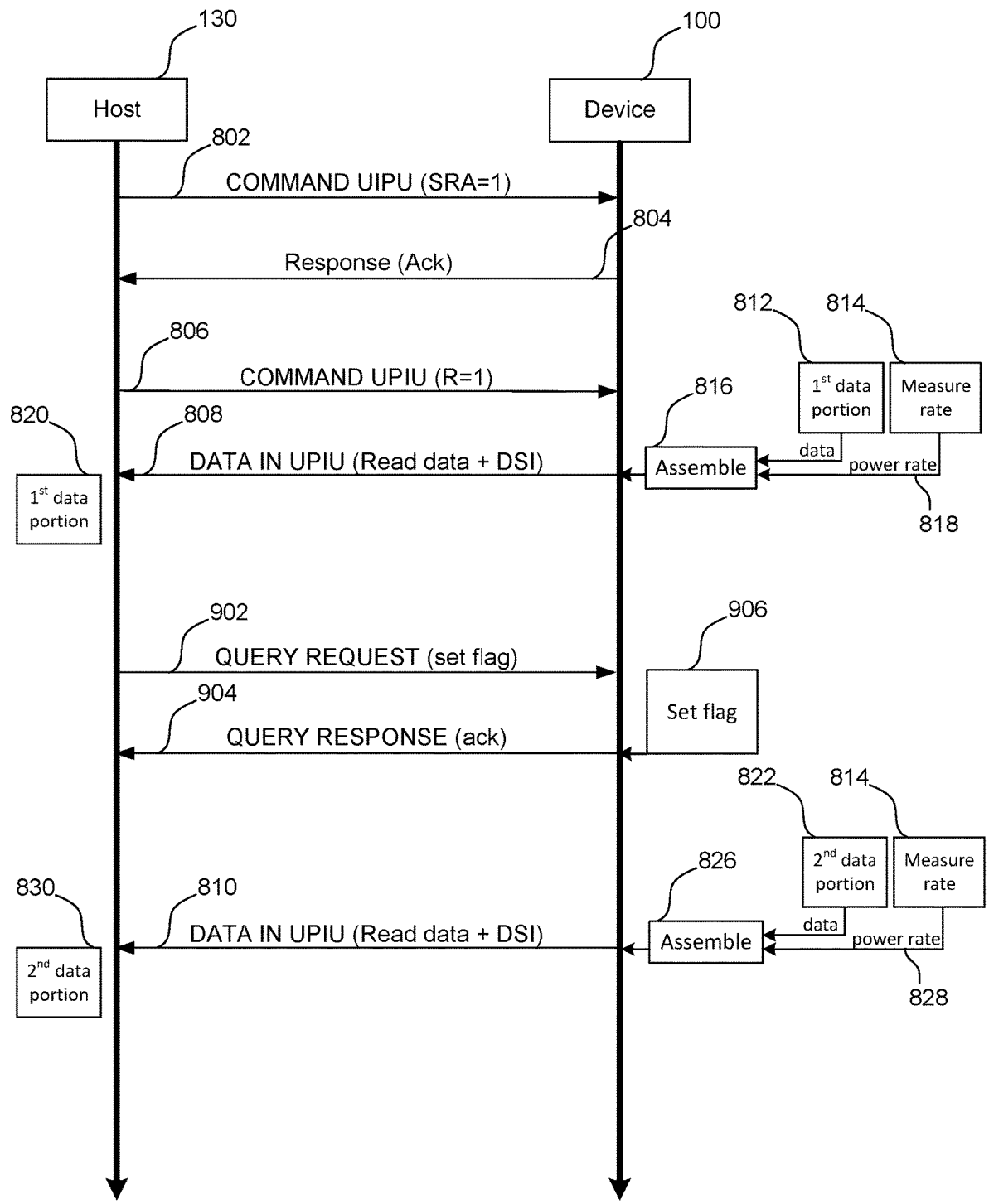
FIG. 9 is a variation of the message flow diagram illustrated in FIG. 8, in which the device receives command data structures of different command types, according to an embodiment.

FIG. 9—Selected Command Type

In some embodiments, the status reporting activation may further comprise a 'selected command type' indicator which indicates one or more command types for which the device 100 should include device status information when transmitting a response data structure in response to receiving these command types. Explicitly, or implicitly, the selected command type may indicate one or more command types for which the device should not include device status information when transmitting a response data structure in response to receiving these unselected command types.

In the situation in which the command data structure received by the device 100 comprises a UIPU data structure, the command type of the command data structure may be indicated by the Transaction Code field within the Transaction Type field.

FIG. 9 is a variation of the message flow diagram illustrated in FIG. 8, in which the device receives command data structures of different command types, according to an embodiment. The first command data structure 802 comprises a status reporting activation which comprises a select command type. In the example illustrated in FIG. 9, the select command type indicator instructs the device to activate status reporting only for response data structures transmitted in response to receiving a command data structures with the command type equal to COMMAND UIPU. In response to receiving command data structures for which the command type is not equal to COMMAND UIPU, the device does not include DSI in the associated response data structure.

The device receives command data structure 902 from the host. Command data structure 902 is a QUERY REQUEST type command, rather than a COMMAND UIPU type command. Accordingly, in response to receiving the command data structure 902, the device performs an operation 906 associated with the command data structure 902, and the device transmits a response data structure 904. Notably, the device does not include device status information in the response data structure 904.

NOP Out Example

In yet another example, the second command data structure comprises a NOP Out UPIU data structure, which the host 130 transmits to the device 100 with the aim of eliciting a response from the device 100. Accordingly, the NOP Out UPIU data structure acts as a ping from the host to the device and may be used to check for a functional connection path between the host and the device. In response to receiving a NOP Out UPIU data structure, the controller 110 causes the device 100 to transmit a NOP In UPIU data structure back to the host 130. In this example, the response data structure comprises the NOP In UPIU data structure, and the response information comprises the header fields of the NOP In UPIU data structure, and in particular, the response field 520.

Internal Counters

In one embodiment, the device 100 is configured to maintain one or more internal counters. The host may activate the transmission of the value of one or more of the internal counters, from the device to the host via status reporting activation.

In one example, the host 130 transmits a command data structure to the device 100, wherein the command data structure comprises a status reporting activation. The status reporting activation comprises a status reporting activation flag and a status reporting category. The status reporting activation flag indicates, to the device, that the device should activate status reporting to communicate DSI to the host. The status reporting category indicates, to the device, that the host has selected an internal counter as the DSI.

In one embodiment, the internal counter comprises a write counter. The write counter indicates a number of write operations the device 100 has performed since the internal counter was set or reset. The device increments the write counter in response to performing a write operation. The device may store the write counter in an internal device report, in any other data from the Device Health Descriptor report, or in system memory 112 or the storage medium 108.

It will be appreciated by persons skilled in the art that numerous variations and/or modifications may be made to the above-described embodiments and examples, without departing from the broad general scope of the present disclosure. The present embodiments are, therefore, to be considered in all respects as illustrative and not restrictive.

The invention claimed is:

1. A data storage device comprising:
   a non-volatile storage medium configured to store host data;
   at least one sensor configured to determine a device status information measurement;
   a data port configured to receive and transmit the host data between a host computer system and the data storage device; and
   one or more processors configured to, alone or in combination:
   receive, via the data port, a first command data structure comprising a status reporting activation, wherein the status reporting activation comprises a selected command type;
   receive, via the data port, a second command data structure comprising a storage operation command, wherein the second command data structure is associated with the selected command type;
   in response to receiving the second command data structure:
   perform a storage operation corresponding to the storage operation command;
   determine a response information associated with the second command data structure; and in response to the status reporting activation:
    determine a status information data by reading a register associated with the device status information measurement from the at least one sensor;
    assemble a response data structure comprising the response information associated with the second command data structure and the status information data; and
    transmit, via the data port, the response data structure;
receive, via the data port, a third command data structure associated with an unselected command type;
determine a response information associated with the third command data structure; and
transmit, via the data port, the response information associated with the third command data structure without the status information data.

2. The data storage device of claim 1, wherein:
the storage operation command is selected from a write preparation command, a read command, and a write command; and
performing the storage operation comprises transferring a selected host data indicated by the storage operation command to or from the non-volatile storage medium.

3. The data storage device of claim 2, wherein:
in response to the storage operation command comprising a write preparation command, the response information comprises an indication of readiness to receive the selected host data from the host computer system;
in response to the storage operation command comprising a read command:
    the storage operation comprises reading the selected host data from the non-volatile storage medium; and
    the response information comprises the selected host data; and
in response to the storage operation command comprising a write command, the storage operation comprises writing the selected host data to the non-volatile storage medium.

4. The data storage device of claim 1, wherein:
the one or more processors are further configured to, alone or in combination:
    determine, in response to receiving the second command data structure, the selected command type from at least one field in a header of the second command data structure; and
    determine, in response to receiving the third command data structure, the unselected command type from at least one field in a header of the third command data structure.

5. The data storage device of claim 1, wherein, in response to receiving the first command data structure from the host computer system, the one or more processors are further configured to, alone or in combination, transmit, via the data port, a first response data structure.

6. The data storage device of claim 5, wherein in response to receiving the first command data structure from the host computer system, the one or more processors are further configured to, alone or in combination:
in response to the status reporting activation:
    determine a first status information data by reading the register associated with the device status information measurement from the at least one sensor;
    assemble the first response data structure comprising a response information associated with the first command data structure and the first status information data; and
    transmit, via the data port, the first response data structure.

7. The data storage device of claim 1, wherein determining the status information data comprises:
determining, from the at least one sensor, the device status information measurement; and
storing the device status information measurement in the register associated with the device status information measurement from the at least one sensor.

8. The data storage device of claim 1, wherein the status reporting activation is a flag field value located in a header of the first command data structure.

9. The data storage device of claim 1, wherein the status information data is a flag field value located in a header of the response data structure.

10. The data storage device of claim 1, wherein the response data structure is a single data structure comprising the response information associated with the second command data structure and the status information data.

11. The data storage device of claim 1, wherein the first command data structure and the second command data structure are compatible with a version of a Joint Electron Device Engineering Council (JEDEC) Integrated Universal Flash Storage (UFS) Specification.

12. The data storage device of claim 1, wherein the first command data structure comprises a Universal Flash Storage (UFS) Protocol Information Unit data structure.

13. The data storage device of claim 1, wherein the status information data comprises:
a plurality of status information data points from the at least one sensor; or
an output of an analysis of the plurality of status information data points.

14. The data storage device of claim 13, wherein the one or more processors are further configured to, alone or in combination, periodically perform a status information determination process to determine the plurality of status information data points.

15. The data storage device of claim 13, wherein the plurality of status information data points has been determined during a time period initiated by the receipt of the first command data structure.

16. The data storage device of claim 1, wherein:
the status reporting activation comprises a status reporting activation flag and a status reporting category;
the status reporting category is selected from a plurality of status reporting categories;
the at least one sensor comprises a plurality of sensors;
each status reporting category of the plurality of status reporting categories is associated with a different sensor of the plurality of sensors; and
determining the status information data comprises selecting the device status information measurement associated with a corresponding sensor of the plurality of sensors based on the status reporting category.

17. The data storage device of claim 1, wherein the status information data comprises an indication of one or more of:
an ambient temperature;
a surface temperature;
a thermal junction temperature;
a power consumption rate;

an indication of a counter value;
an acceleration; or
a measurement from a sensor.

18. The data storage device of claim 1, wherein:
the at least one sensor comprises a temperature sensor; and
the one or more processors are further configured to, alone or in combination, in response to receiving the second command data structure:
determine an indication of temperature from the temperature sensor;
store the indication of temperature to the register; and
read the indication of temperature from the register.

19. A method comprising:
receiving, via a data port of a data storage device, a first command data structure comprising a status reporting activation, wherein:
the status reporting activation comprises a status reporting activation flag and a status reporting category;
the status reporting category is selected from a plurality of status reporting categories;
the data storage device comprises:
a non-volatile storage medium configured to store host data;
a plurality of sensors configured to determine different device status information measurements; wherein each status reporting category of the plurality of status reporting categories is associated with a different sensor of the plurality of sensors; and
the data port configured to receive and transmit the host data between a host computer system and the data storage device;
receiving, via the data port, a second command data structure comprising a storage operation command; and
in response to receiving the second command data structure:
determining a response information associated with the second command data structure; and
in response to the status reporting activation:
determining a status information data by:
selecting a device status information measurement associated with a corresponding sensor of the plurality of sensors based on the status reporting category; and
reading a register associated with the device status information measurement from the corresponding sensor;
assembling a response data structure comprising the response information associated with the second command data structure and the status information data; and
transmitting, via the data port, the response data structure.

20. A data storage device comprising:
a non-volatile storage medium configured to store host data;
at least one sensor configured to determine a device status information measurement,
wherein the at least one sensor comprises a temperature sensor;
a data port configured to receive and transmit the host data between a host computer system and the data storage device; and
means to:
receive a first command data structure comprising a status reporting activation;
receive a second command data structure comprising a storage operation command; and
in response to receiving the second command data structure:
determine a response information associated with the second command data structure; and
in response to the status reporting activation:
determine an indication of temperature from the temperature sensor;
store the indication of temperature to a register associated with the temperature sensor;
read the indication of temperature from the register;
determine a status information data from the indication of temperature from the register;
assemble a response data structure comprising the response information associated with the second command data structure and the status information data; and
transmit the response data structure.

* * * * *